(12) United States Patent
Freneau et al.

(10) Patent No.: US 12,000,492 B2
(45) Date of Patent: Jun. 4, 2024

(54) HOLDING DEVICE FOR A NON-RETURN VALVE FLAP AND METHOD FOR POSITIONING SAME

(71) Applicant: Electricite de France, Paris (FR)

(72) Inventors: Coralie Freneau, Saint Avertin (FR); Fabien Houssay, Amilly (FR); Maurice Dantic, Restigne (FR)

(73) Assignee: Electricite de France (FR)

( * ) Notice: Subject to any disclaimer, the term of this patent is extended or adjusted under 35 U.S.C. 154(b) by 41 days.

(21) Appl. No.: 17/796,462

(22) PCT Filed: Jan. 26, 2021

(86) PCT No.: PCT/EP2021/051748
§ 371 (c)(1),
(2) Date: Jul. 29, 2022

(87) PCT Pub. No.: WO2021/151886
PCT Pub. Date: Aug. 5, 2021

(65) Prior Publication Data
US 2023/0139915 A1    May 4, 2023

(30) Foreign Application Priority Data
Jan. 31, 2020   (FR) ...................................... 2000946

(51) Int. Cl.
*F16K 15/00* (2006.01)
*F16K 15/03* (2006.01)
*G01M 3/02* (2006.01)

(52) U.S. Cl.
CPC ............. *F16K 15/03* (2013.01); *G01M 3/022* (2013.01)

(58) Field of Classification Search
CPC ......... F16K 15/03; F16K 1/523; G01M 3/022
See application file for complete search history.

(56) References Cited

U.S. PATENT DOCUMENTS 7,533,693 B2 * 5/2009 Colton, Jr. .......... F16K 37/0008
137/553
2008/0083464 A1 * 4/2008 Shimizu ................ F16K 1/2007
137/527

FOREIGN PATENT DOCUMENTS

| CN | 204477396 U | 7/2015 |
| FR | 2751006 B1 | 10/1998 |
| FR | 2989146 B1 | 4/2014 |
| WO | 0003172 A1 | 1/2000 |
| WO | 2005080852 A1 | 9/2005 |

OTHER PUBLICATIONS

French Preliminary Search Report for Application No. 2000946 dated Sep. 22, 2020, 2 pages.
International Search Report for Application No. PCT/EP2021/051748 dated Feb. 15, 2021, 2 pages.

* cited by examiner

*Primary Examiner* — P. Macade Nichols
(74) *Attorney, Agent, or Firm* — Lerner David LLP

(57) ABSTRACT

A device for holding a flap of a non-return valve in a closed position, which is configured to carry out hydraulic testing of a device or apparatus, includes a body which takes the form of a caliper with two arms that are articulated relative to each other, at a first of the two opposite ends thereof, about a first axis, in that it includes a holder articulated about the first axis and in that the two arms each has, at the second end thereof, a pad pivoting about axes that are parallel to the first axis.

11 Claims, 5 Drawing Sheets

PRIOR ART

HOLDING DEVICE FOR A NON-RETURN VALVE FLAP AND METHOD FOR POSITIONING SAME

CROSS-REFERENCE TO RELATED APPLICATIONS

The present application is a national phase entry under 35 U.S.C § 371 of International Application No. PCT/EP2021/051748 filed Jan. 26, 2021, which claims priority from French Application No. 2000946 filed Jan. 31, 2020, all of which are hereby incorporated herein by reference.

GENERAL TECHNICAL FIELD

The present invention lies in the field of the execution of maintenance operations, of hydraulic tests or trials (tests of resistance to pressure) of a hydraulic installation including at least one non-return valve.

BACKGROUND OF THE INVENTION

Numerous industrial installations comprise capacities (reservoirs, liners, exchangers, etc.) coupled to pipes (pipework) for the passage of fluids, liquid or gaseous, often under pressure.

To guarantee reliable and secure operation of these installations, the maintenance of such systems necessitates regular testing of pressure resistance and the regulation of pressurized devices also imposes periodically executed hydraulic trials.

Hereafter in the text, what will be meant by "resistance to pressure" is the capacity to resist mechanical loads produced by such a pressurization, which can cause the deformation of components of said industrial installations, a loss of integrity of the mechanical connections of said components and loss of their sealing capacity.

For the execution of pressure resistance tests or hydraulic trials of reservoirs, liners or any other type of capacity, it is necessary to modify the configuration of the installation to create a test or trial "bubble," i.e. a closed circuit allowing the pressurization of the capacity with a view to its technical evaluation.

For the creation of this closed circuit, it is therefore necessary to be able to block each of the inlets/outlets of the liner, particularly when they are coupled to a pipe, in order to isolate the internal volume of the liner.

Venting points, i.e. vents, are provided to allow the air present in the devices and pipework to be expelled, and to guarantee the stabilization of the pressure during the hydraulic trial.

A trial pump is used to manage the filling and the pressure rise, the presence of a manometer allowing guaranteeing the attainment of the test pressure. In certain cases, tests or trials are carried out for example with demineralized water at ambient temperature.

To create the hydraulic trial bubble, it is possible to rely on existing bolted assemblies in the installation by using suitable stoppers for the isolation of the liner or of the pipe. However, in industries using fluids considered dangerous (toxic, flammable, explosive, etc.) or hot fluids (steam for example), the capacities and pipework are bereft of flanges which would have allowed, after dismantling, installing bolted plugs (solid bottoms, solid flanges), that allow blocking.

Thus, it is generally necessary to cut the pipe and to weld a blocking member at the cut cross section of the pipe.

Unfortunately, a blocking technique of this type has a large number of disadvantages.

First of all, a solution of this type involves a complex implementation, generating a lengthy intervention, requiring rare specific human resources (welders, checkers, etc.) and considerable needs in material logistics (overhead cranes, scaffolding, airlock, insulation removal system, etc.).

The intervention also comprises the risk of large workmanship hazards (defects, flaws, etc.). Moreover, the intervention necessitates the supply of costly replacement parts (welded blocking devices, pipework elements for restoring compliance, etc.), and in which delays in supplying which are long, taking into account their specific technical characteristics. The welded blocking devices have a limited lifespan due to the cuts that are carried out, so that this necessitates regular new provisioning.

Finally, the implementation of this solution in certain installations most often necessitates carrying out specific inspections, such as for example non-destructive inspections of the type of those which use gamma rays, inspections completed moreover by the establishment of an administrative file defined by the regulations in force. The said inspections have, among other risks inherent in welding, radiological risks leading to the positioning of extended and specific signage, which imposes a stoppage of activities in progress in proximity to gamma shots.

One solution for avoiding these disadvantages linked to the use of welded stoppers consists of using mechanical or inflatable blocking devices and positioning them in the pipes so as to block them. Depending on the configuration, several types of stoppers can be used.

Thus, the mechanical stoppers described in document FR2989146 are known. These large-dimensioned stoppers are assembled inside the pipework, which allows their positioning despite the fact that access to the pipework is accomplished through orifices with dimensions smaller than the diameter of the pipe. These stoppers necessitate access in proximity to allow the instrumentation which will serve for the transmission of the measurements for the purpose of verifying and checking their sealing during the hydraulic test.

Also known are inflatable stoppers like those described in FR2751006. These stoppers necessitate access in proximity to allow power supply and to guarantee their durability in the pipe during the hydraulic test, and possibly to adjust their inflation pressure. Their application has technical limits due to the configuration of the intended industrial installations.

Also available are mechanical stoppers such as those of document WO 00/03172. These stoppers have the disadvantage of necessitating cutting the pipe which must be plugged, before they are positioned. The disadvantages linked to welding work are reduced but are not eliminated, because they remain present when the compliance of the installations is restored.

What is more, these stoppers, mechanical or inflatable, whether they require the pipework to be cut or not, have the disadvantage of necessitating straight lengths with sufficient dimensions in order to be installed. Moreover, said lengths must be devoid of surface faults, be accessible, and their environment must allow the handling of stoppers, which is not always the case.

When the installation allows it, it is possible to rely on the fittings associated with the liner at the inlets/outlets and dimensioned to resist pressurization, during hydraulic tests or trials.

Among the fittings used in industry are included, among others, non-return valves with flaps.

Hereafter in the present application, what is meant by "valve" is a non-return valve.

Thus, when referring to the appended FIG. 1, a non-return valve with a flap known to the prior art is observed. It includes a body 10 which is topped here by a seal 11 and by a cover 12, held in place by dowels 120 (only one is visible in FIG. 1).

The body 10 defines an upper space 100 with a vertical orientation which communicates by its lower portion with a lower space with a horizontal orientation 101, which is a fluid passage location through the non-return valve 1.

The numerical reference 2 designates the flap of the non-return valve 1 which, in the blocking position, is applied to a seat 3. Noted is the presence of a pivot axis 30, of a lever 31 and of a nut 32 which allow the articulation of the flap 2 relative to the lever 31.

The arrows f illustrate the direction of movement of the liquid through the valve, in normal use. This movement tends to raise the flap 2, as illustrated by the arrow g.

The use of a valve at the limit of a hydraulic trial of an installation necessitates that the flap 2 be in a closed position.

In practice, the accomplishment of hydraulic trials is not carried out with this type of equipment for reasons of reliability.

The application of the test pressure downstream of the flap (when considering the normal direction of movement of the liquid in the valve, as shown by FIG. 2) is not sufficient for guaranteeing the necessary sealing for the validation of the hydraulic tests or trials. The fittings being designed with a coefficient of "unsealing" according to design standards such as NF E29-311-1, NF EN 12266-1 dated Jan. 5, 2012, tolerating for example a leakage flow rate of 10.5 mm$^3$/s for valves with a DN (nominal diameter) equal to 350 mm, of the requisite quality for said installations; a simple verification of the correct operation of the valve is not sufficient, any more than an internal inspection of the valve, comprising the removal of the flaps, spindle and lever, allowing requalifying the fluid non-return function by the evaluation of the span flap 2-seat 3 then, if necessary, carrying out a lapping of it.

This long-duration work necessitates rare competencies in fittings, often prioritized over other activities. Moreover, in the event of a fault, the intervention can necessitate the provisioning of replacement parts, with long provisioning delays. Another disadvantage is the multiplication of work on devices that are not subject to a preventive maintenance program.

In order to guarantee the perfect sealing required at the flap-seal span for hydraulic trials, it can be contemplated to install a closure blocking tool in order to guarantee the sealing of the non-return valve.

In this case, the cover 12 is removed to allow its positioning. There exists no industrial tooling on the market responding to this need.

Handmade tooling is sometimes implemented, but this has a large number of disadvantages.

First of all, this tooling is very intrusive, requiring the removal of the flap of the valve and presenting major risks of alteration of the casting in particular.

Then too, they are heavy and have risks in terms of safety linked to manual handling activities, including the crushing of hands.

Finally, for each new valve to be tested, design is to be renewed, as a new calculation note must be produced.

From the foregoing, it follows that in the majority of cases, the positioning of a welded blocking device upstream of the valve is preferred for securing the hydraulic trials of the installations. The disadvantages of these welded devices are those previously mentioned.

One object of the present invention is to propose a device for "blocking in the closed position" a non-return valve with a flap allowing solving at least one of the previously mentioned disadvantages.

In particular, one object of the present invention is to guarantee perfect sealing while allowing the use of non-return valves with flaps as boundaries in a hydraulic trial.

Another object of the present invention is to propose a device suited to all dimensions and all the producers of non-return valves with flaps, in order to respond to the entire range of needs (dimensions from DN 350 to 900) for hydraulic trials of the devices and capacities of French nuclear power plants in particular.

Another object of the present invention is to propose a device the positioning of which is simple, quick, able to be carried out by a single intervener with complete safety, and not requiring specific technical and human qualification.

Yet another object of the invention is to propose a device of which the integrity is guaranteed from the beginning to the end of its implementation, all the elements of the components being considered un-losable.

A complementary object of the present invention is to avoid any intrusive operation necessitating heavy maintenance operations of the lapping type, mobilizing rare fitting resources.

Yet another complementary object of the present invention is to allow expelling the air trapped in the closed circuit to guarantee the stability of the pressure during the test.

PRESENTATION OF THE INVENTION

To this end, a first aspect of the invention relates to a device for holding a flap of a non-return valve in the closed position, with a view to carrying out a hydraulic trial of an equipment or of an installation, characterized in that it includes a body which takes the shape of a caliper with two arms which are articulated with respect to one another at a first of their two opposite ends, around a first axis, that it has a holder articulated around said first axis and that said two arms each include, at their second end, a pad pivoting around axes parallel to said first axis.

Due to these characteristics, what is involved is a device that is simple in its structure, its positioning and in its operation, by means of which it is possible to hold the flap of a large number of non-return valves in the closed position.

According to other advantageous and non-limiting characteristics of the invention, taken alone or in any combination:

said arms are removable and interchangeable;
said holder is removable and interchangeable;
said holder has a cylindrical shape;
the device includes a screw for adjusting the spacing of said arms;
said pads are coated with a non-slip material;
it includes a holding foot;
said foot is articulated around said first axis;
the free end of said foot is provided with a pad.

Another aspect of the invention relates to a method for positioning a device according to one of the preceding claims in a body of a valve including a non-return valve with a flap, with a view to carrying out a hydraulic trial, characterized by the fact that it includes the following steps:

positioning a gasket between said flap and its seat;

introducing said device so that said holder is supported against said flap in the closed position and that said pads are supported on the body of said valve, then immobilization of said device.

DESCRIPTION OF THE FIGURES

Other features and advantages of the invention will appear from the description which will now be given, with reference to the appended drawings, which show by way of indication but without limitation different possible embodiments of it.

In these Drawings.

DETAILED DESCRIPTION OF THE INVENTION

Figure 1:
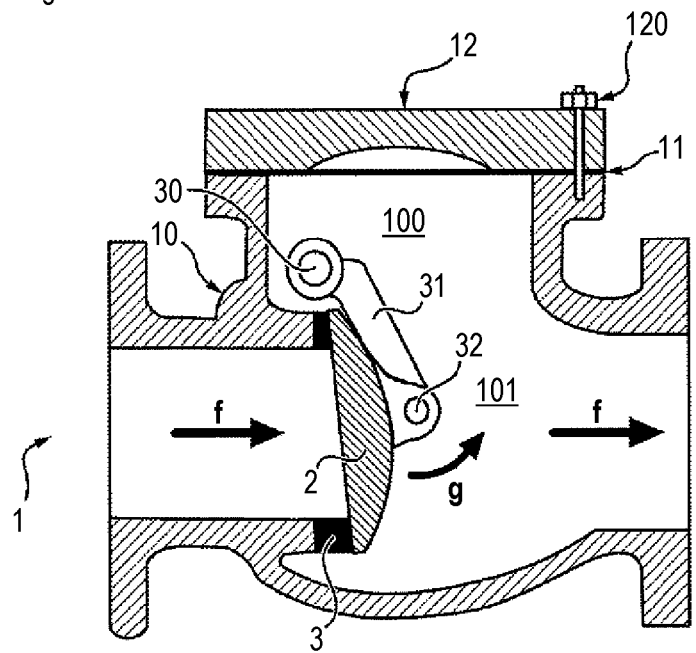
FIG. 1 is a vertical section view of a structure of a non-return valve with a flap known from the prior art.
Figure 2:
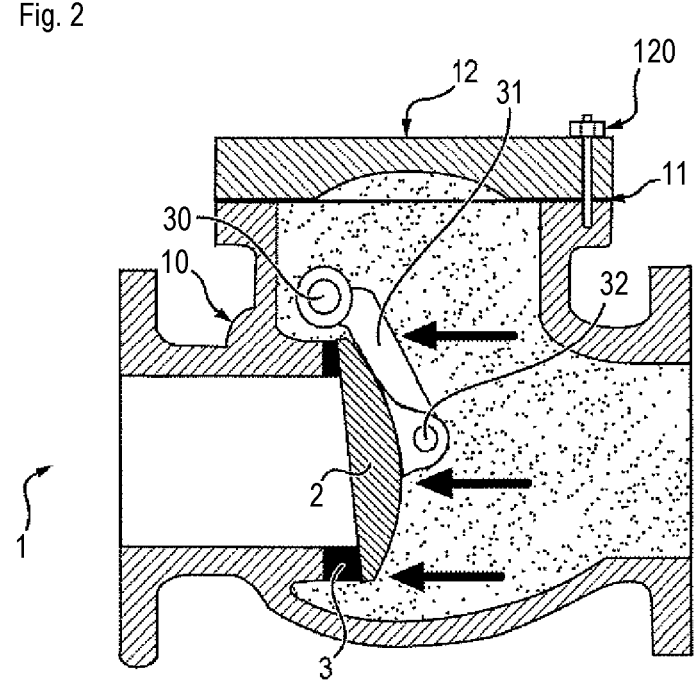
FIG. 2 is a view similar to the preceding one intended to illustrate the operation of the valve when the installation is in the hydraulic trial configuration.
Figure 3:
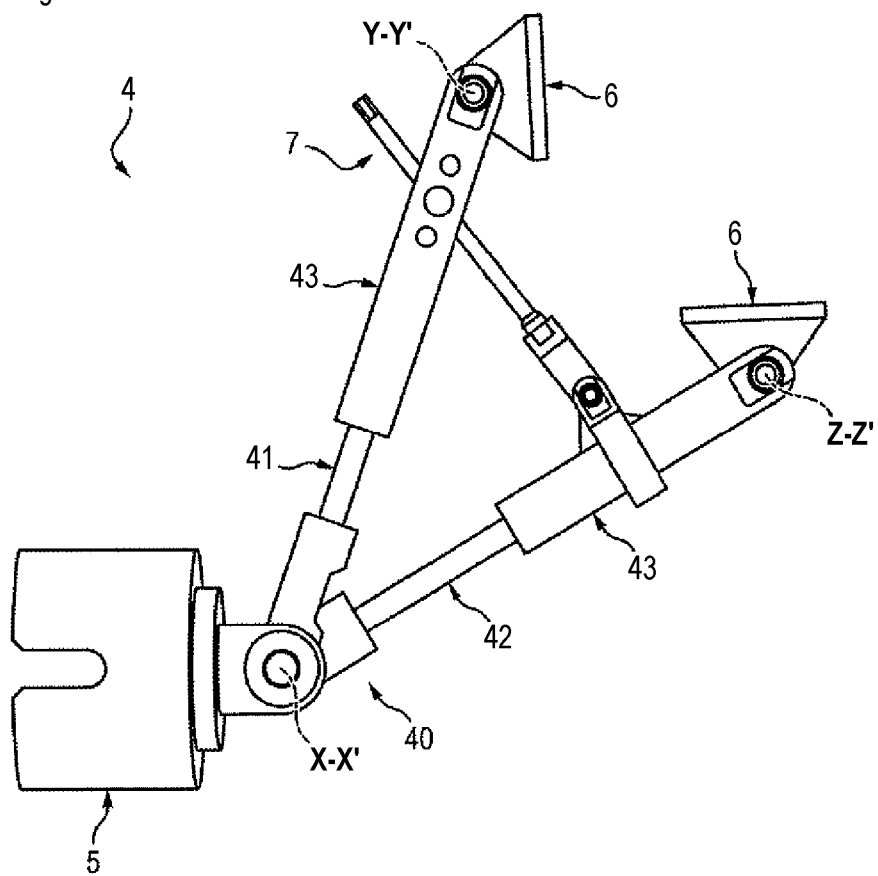
FIG. 3 is a side view of a first embodiment of the device according to the invention.
Figure 4:
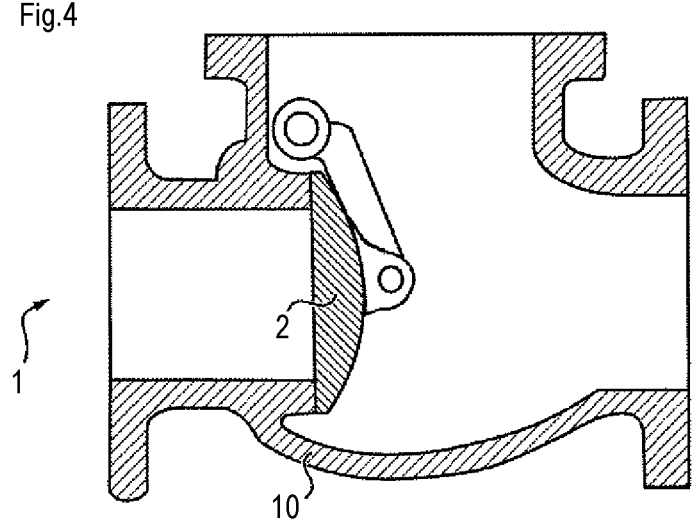
FIG. 4 is a vertical section view of a structure of a non-return valve with a flap having positioned a device like that shown in FIG. 3.
Figure 5:
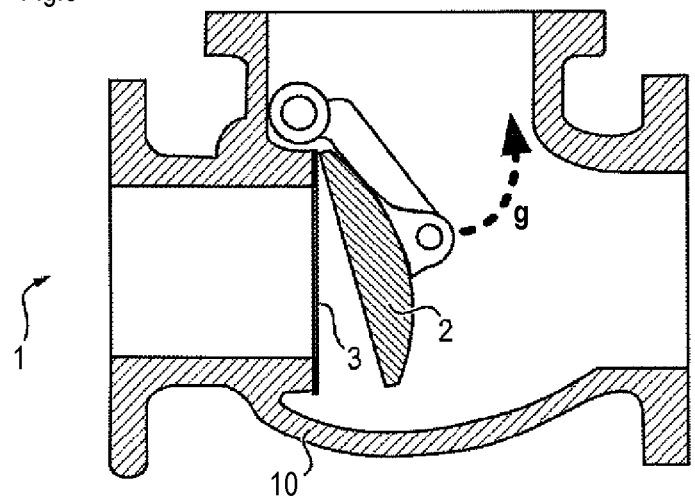
FIG. 5 is a view similar to the preceding one showing the prior positioning of a gasket.
Figure 6:
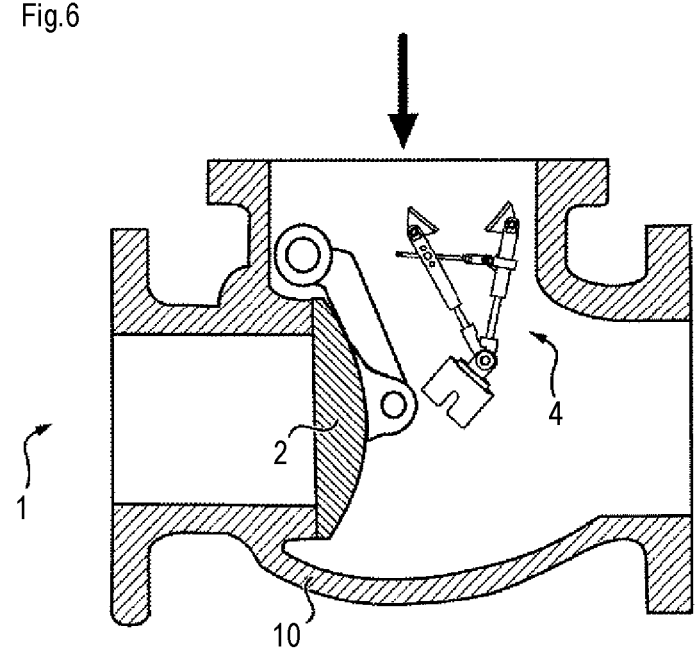
FIG. 6 is a view similar to FIG. 4 showing the positioning of a device like that shown in FIG. 3.
Figure 7:
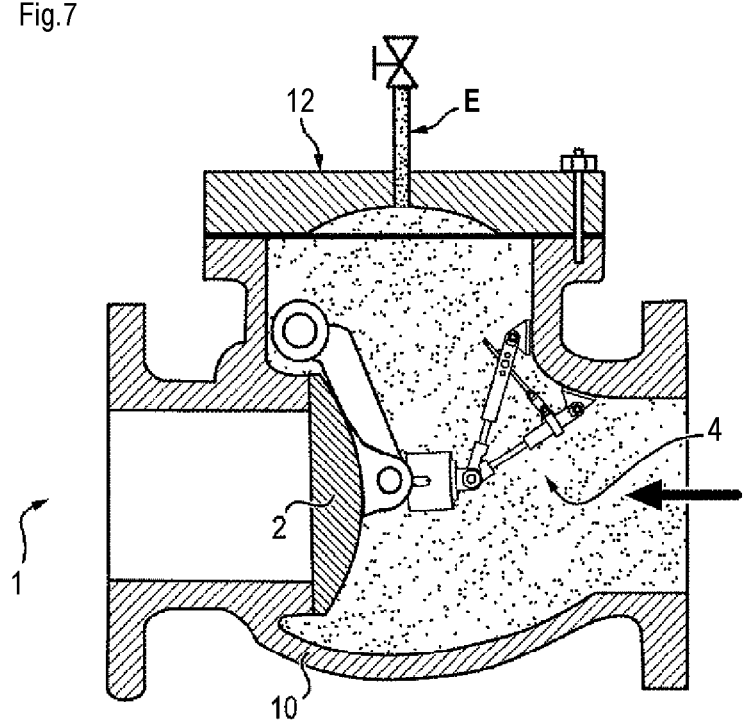
FIG. 7 is a view similar to the preceding one, the device being in place, this figure illustrating the operation of the valve when the installation is in the hydraulic trial configuration.

A first embodiment of the device according to the invention is shown in the appended FIG. 3.

This device 4 is essentially formed of metallic parts. It includes a main body 40 which takes the general shape of a caliper with two arms 41 and 42. It is dimensioned to adapt to a large range of valves, for example for nominal diameters comprised between 350 and 900 mm.

The two arms 41 and 42 are articulated with respect to one another at a first of their two opposite ends, around an axis embodied by the reference X-X' in the figure.

The arms 41 and 42 advantageously consist of two screws with a trapezoidal thread, preferably removable and interchangeable, so as to make the device 4 adaptable regardless of the characteristics of the valve to be equipped.

This device 4 is also provided with a holder 5, of cylindrical shape here, so as to allow a greater adaptability to the attachment nuts of the valve flaps. This holder is also articulated around the previously mentioned axis X-X', so as to be able allow it to occupy any desired orientation with respect to that of the arms 41 and 42. Advantageously, this holder is made removable and interchangeable to be able to adapt to a large range of valve diameters. Although not shown here, the holder can be equipped with a holding screw allowing locking its position before adjusting the entire device.

Two knurled adjustment knobs 43 are provided to facilitate pre-emption and ensure the manual clamping of the device.

At the free end of each of the arms 41 and 42, i.e. at their end opposite to the holder 5, a pivoting pad 6 is provided. Each pad is movable around an axis Y-Y', respectively Y-Y', Z-Z', parallel to the previously mentioned axis X-X'

Advantageously, the pads 6 are coated with a non-slip material, namely with a friction coefficient guaranteeing the absence of slippage and the preservation of the casting of the valve in which the device is intended to be installed.

An adjustment screw 7 allows holding in position the two arms 41 and 42 of the device. A clamping to a set torque is carried out on this screw after the positioning of the tool.

According to a possible embodiment, the different elements of this device are all designed to be removable using "quick release" clip.

Figure 8:
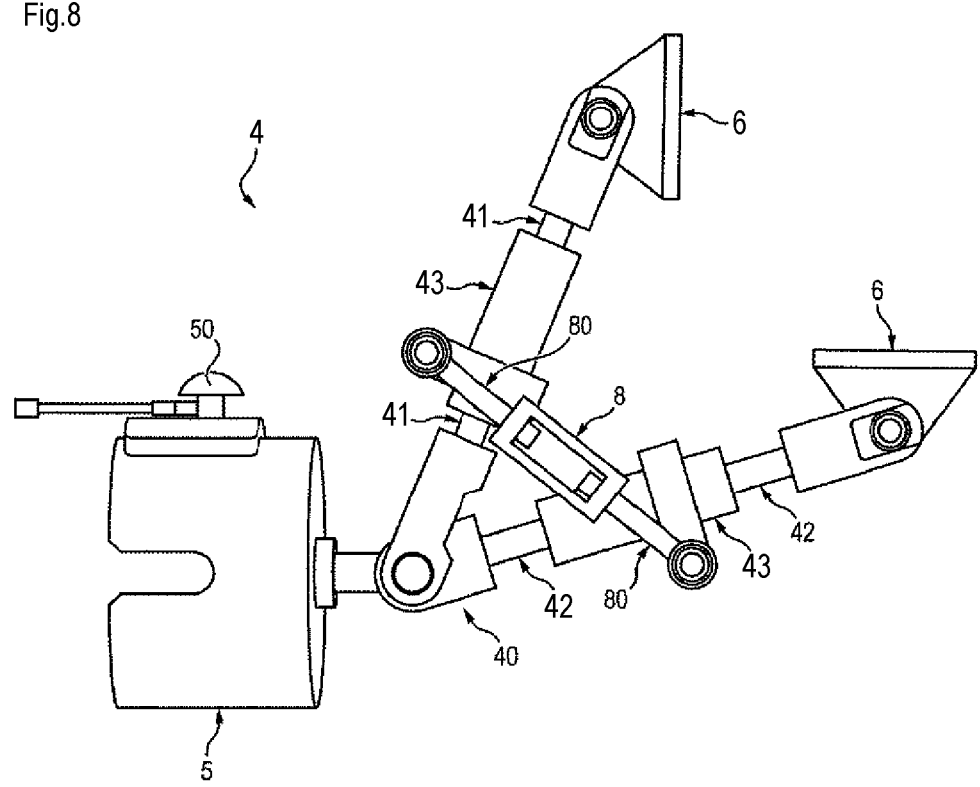
FIG. 8 is a side view of a second embodiment of the device according to the invention.

In the appended FIG. 8 is shown substantially the same device as that of FIG. 3. In these figures, the name numerical references designate identical or similar elements. This variant is differentiated from that already described by the fact that the adjustment screw 7 is replaced by two distinct threaded rods 80, one with a left-hand thread and the other with a right-hand thread, connected by a cylindrical part 8 forming an adjustment knob. This variant allows simplifying the adjustment of the device. In this figure, a screw 50 for retaining the holder 5 in position is visible.

Figure 9:
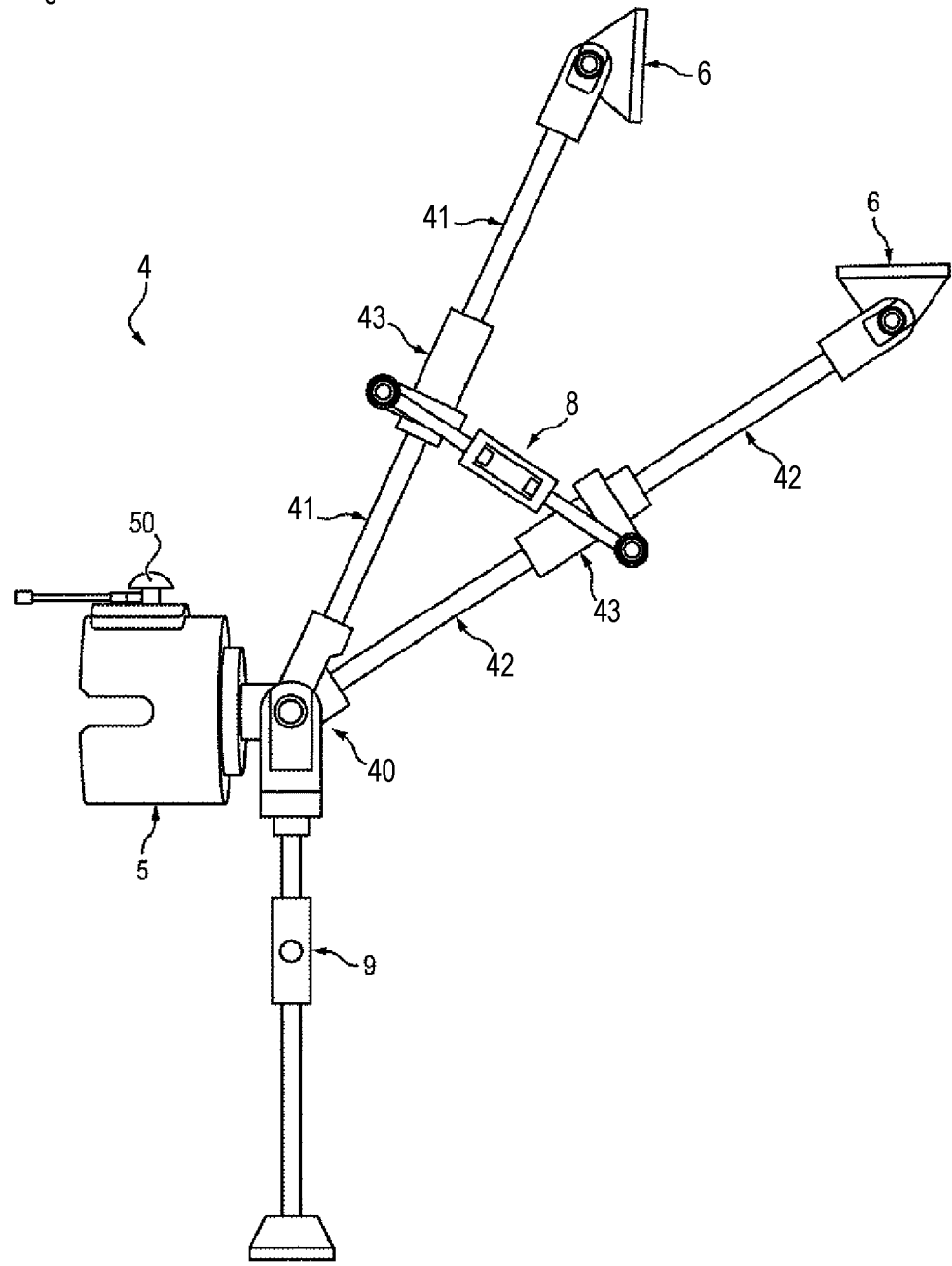
FIG. 9 is a side view of a third embodiment of the device according to the invention.

For non-return valves with flaps of large diameter, a device 4 can be provided with a holding foot 9 as shown in FIG. 9, located at the holder 5 so as to support the weight of the assembly.

This foot 9 is movable around an axis.

The device 4 is assembled according to the desired configuration before introduction into the body of the valve, in order that it can be handled in a single block, and to dispense with any risk of loss of elements.

It has several degrees of freedom, which brings flexibility into its handling.

The present invention also has as its object a method for positioning a device of this type in a non-return valve with a flap, with a view to carrying out a hydraulic trial of the installations. This method includes essentially the following steps:

positioning a gasket between said flap and its seat;
introducing said device so that said holder is supported against said flap in the closed position and that said pads are supported on the body of said valve, then immobilization of said device.

This process is described in detail hereafter, with reference to FIGS. 4 to 7, in which it is proposed to position a device 4 like that shown in FIG. 3.

Once the cover of the body 1 is removed (situation of FIG. 4), the flap 2 of the valve (FIG. 5) is lifted to position a gasket 3 on the span between the flap 2 and its seat.

Preferably, this involves a machined seal with allows adapting its shape to that of the valve and of which the thickest position is positioned opposite to the axis of maneuver of the flap 2. However, a flat seal with sufficient thickness can also be used, whether in the case of absence of a machined seal or for reasons of cost.

The device 4 is then adjusted depending on the bulk of the valve to be able to be introduced and positioned on the body 10 by means of knurled adjustment knobs 43.

The mobility of the pads 6, as well as the nature of their coating, allow self-positioning in the body 10.

The adjustment screw 7 is preferably oriented upward, a clamping to a set torque then being applied. This clamping allows the holding in position of the device during the rise of water in the piping.

Sealing is guaranteed by the autoclave effect through the action of the test pressure on the flap, without necessitating checking or adjustment in service.

The body 10 is then formed by positioning its cover 12, which is equipped with a seal and with a venting system E. The latter allows expelling the residual air present in the body 10. It is composed of a high-pressure assembly comprising a flexible hose connected to a valve, the flexible hose being assembled to the cover 12 by means of a screwed element.

This device can be used on all the dimensions of flaps 2, regardless of the inclination of the valve spans.

This device has been designed for hydraulic trials of exchangers and capacities of the conventional island of nuclear power plants. Taking its feature into account, it can be used on all non-return valves needing to be blocked, whether for maintenance operations or hydraulic tests or trials in any type of industry (chemical, petrochemical, etc.).

In the case of hydraulic trials of exchangers and capacities of French nuclear power plants, the following advantages are highlighted:
- The positioning of tooling is simple. It does not require particular competencies other than the base competencies required within the scope of hydraulic trials. Nor does it require undergoing specific training, an operation guide being supplied for the intervention.
- An intervener can position the tooling alone with complete safety, which allows optimizing the resources mobilized for the activity.
- The use of this tooling brings economic gains relative to the solutions currently implemented such as the positioning of welded blocking devices.
- The use of this tooling also allows reducing the planning of the activity with respect to welding work, and the restoration of compliance is faster.

The invention claimed is:

1. A device for holding a flap of a non-return valve in a closed position and configured to carry out a hydraulic trial of equipment or an installation, comprising:
   a body in a form of a caliper with first and second arms, each of first and second arms having a first end and a second end opposite the first end, the first and second arms articulated with respect to one another at the first end, around a first axis, and
   a holder articulated around said first axis,
   wherein said first and second arms include, at the second end, a first pad and a second pad, respectively, pivoting around second and third axes, respectively, parallel to said first axis.

2. The device according to claim 1, wherein said first and second arms are removable and interchangeable.

3. The device according to claim 2, wherein said holder is removable and interchangeable.

4. The device according to claim 1, wherein said holder is removable and interchangeable.

5. The device according to claim 1, wherein said holder has a cylindrical shape.

6. The device according to claim 1, further comprising a screw for adjusting a spacing of said first and second arms.

7. The device according to claim 1, wherein said first and second pads are coated with a non-slip material.

8. The device according to claim 1, further comprising a holding foot.

9. The device according to claim 8, wherein said holding foot is articulated around said first axis.

10. The device according to claim 9, further comprising a pad at a free end of said holding foot.

11. A method for positioning a device according to claim 1 in a body of a valve including a non-return valve with a flap, for carrying out a hydraulic trial, comprising:
    positioning a gasket between said flap and a seat of said flap;
    introducing said device so that a holder is supported against said flap in a closed position and so that said first and second pads are supported on the body of said valve of said device; and
    immobilizing said device.

\* \* \* \* \*